(12) United States Patent
Lee et al.

(10) Patent No.: US 7,040,767 B2
(45) Date of Patent: May 9, 2006

(54) INTEGRATOR MODULE WITH A COMPACT LIGHT SOURCE AND PROJECTION DISPLAY HAVING THE SAME

(75) Inventors: Young-chol Lee, Suwon-si (KR); Dong-ha Kim, Suwon-si (KR); Yasunori Kuratomi, Seongnam-si (KR); Il-kweon Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 10/812,965

(22) Filed: Mar. 31, 2004

(65) Prior Publication Data

US 2005/0057731 A1 Mar. 17, 2005

(30) Foreign Application Priority Data

Sep. 17, 2003 (KR) .................. 10-2003-0064576

(51) Int. Cl.
| | |
|---|---|
| G03B 21/26 | (2006.01) |
| G03B 21/14 | (2006.01) |
| G03B 21/28 | (2006.01) |
| G01D 11/28 | (2006.01) |
| G02B 6/00 | (2006.01) |

(52) U.S. Cl. ...................... 353/99; 353/94; 353/97; 362/26; 362/582

(58) Field of Classification Search .............. 353/94, 353/97–99; 362/26, 551, 582; 313/372, 313/475

See application file for complete search history.

(56) References Cited

U.S. PATENT DOCUMENTS

| 5,772,299 A | * | 6/1998 | Koo et al. ............... 353/20 |
| 2005/0018147 A1 | * | 1/2005 | Lee et al. ............... 353/98 |

FOREIGN PATENT DOCUMENTS

JP      2001-42431      2/2001

OTHER PUBLICATIONS

U.S. Appl. No. 10/819,152, filed Apr. 7, 2004.
U.S. Appl. No. 10/854,701, filed May 27, 2004.

* cited by examiner

*Primary Examiner*—W. B. Perkey
*Assistant Examiner*—Magda Cruz
(74) *Attorney, Agent, or Firm*—Stanzione & Kim, LLP (57) ABSTRACT

A projection display includes three integrator modules which emit red, green, and blue beams, respectively. The integrator modules include at least one compact light source and a glass rod that transforms a light beam emitted from the at least one compact light source so as to have a uniform light intensity and emits a modulated light beam. The glass rod includes an incident portion through which the light beam radiates, and an emission portion through which the light beam is emitted. The incident portion includes a parabolic first reflective surface to collimate the light beam radiating from the at least one compact light source, and the at least one compact light source is located in the vicinity of a focal point of the first reflective surface.

22 Claims, 10 Drawing Sheets

INTEGRATOR MODULE WITH A COMPACT LIGHT SOURCE AND PROJECTION DISPLAY HAVING THE SAME

CROSS-REFERENCE TO RELATED APPLICATIONS

This application claims the priority of Korean Patent Application No. 2003-64576, filed on Sep. 17, 2003, in the Korean Intellectual Property Office, the disclosure of which is incorporated herein in its entirety by reference.

BACKGROUND OF THE INVENTION

1. Field of the Invention

The present invention relates to a projection display, and more particularly, to a projection display adopting a compact light source such as light emitting diode.

2. Description of the Related Art

Figure 1:
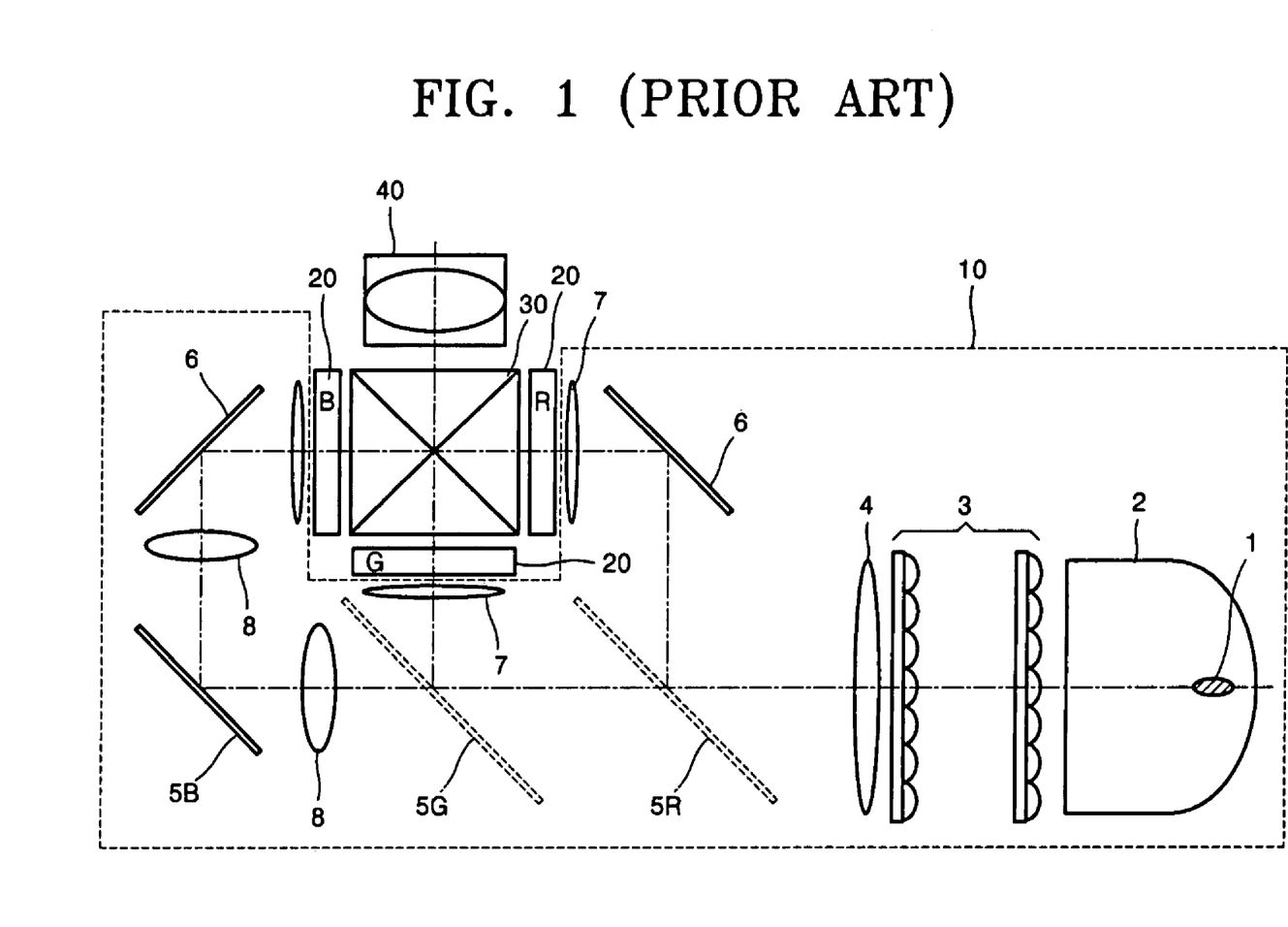
FIG. 1 is a view showing a structure of a conventional projection display.

FIG. 1 shows a structure of a conventional projection display. Referring to FIG. 1, the conventional projection display includes liquid crystal display (LCD) panels 20R, 20G, and 20B which are optical modulators, an illumination unit 10 which irradiates light onto the LCD panels 20R, 20G, and 20B, and a projection lens 40 which magnifies and projects a modulated image.

The LCD panels 20R, 20G, and 20B modulate red (R), green (G), and blue (B) beams, respectively, to be suitable for respective image data so as to display a color image. Reference numeral 30 denotes a synthesizing prism which combines the modulated R, G, and B beams into a beam and then irradiates the combined beam onto the projection lens 40.

The illumination unit 10 includes a light source 1, an integrator 3, a condenser lens 4, a plurality of mirrors 5R, 5G, 5B, and 6, and a plurality of relay lenses 7 and 8.

The light source 1 may be a metal halide lamp or a super-high voltage mercury lamp and is located at a focal point of a reflective mirror 2 with a parabolic surface. The integrator 3 is used to irradiate a uniform beam onto the LCD panels 20R, 20G, and 20B and generally made of two fly-eye lenses in which micro-lenses are 2-dimensionally arrayed. A light beam, which has passed through the integrator 3, is condensed by the condenser lens 4. The mirrors 5R, 5G, and 5B are selective reflector mirrors which reflect the R, G, and B beams, respectively, and transmit other color beams. A light beam is split into the R, G and B beams via the mirrors 5R, 5G, and 5B, respectively, and then the R, G, and B beams are incident on the LCD panels 20R, 20G, and 20B, respectively, through the relay lenses 7 and 8. The LCD panels 20R, 20G, and 20B modulate the R, G, and B beams, respectively, so as to output R, G, and B color images. The synthesizing prism 30 combines the R, G, and B beams, i.e., the R, G, B color images, output from the LCD panels 20R, 20G, and 20B into a one beam, and then the projection lens 40 magnifies and projects the combined beam.

However, in such a conventional projection display, a lamp is used as a light source to illuminate optical modulators and has a short life span. Therefore, when the conventional projection display is used at homes, the lamp should be frequently replaced with a new one. Also, the light source is large-sized. In order to solve these problems, studies on the use of compact light sources such as light emitting diode (LED) with a relatively long life span, etc. are in progress. For example, Japanese Patent Publication No. JP 2001-42431 discloses a projection device using an LED.

In order to increase an amount of light to be effectively projected by the projection lens 40, the conventional projection display requires secondary optics to collimate a light beam radiating from the LED before irradiating the light beam onto the optical modulators. As a result, the additional use of the secondary optics makes an illumination system of the conventional projection display complicated and increases manufacturing costs of the illumination system. In general, an LED emits a smaller amount of light than a metal halide lamp or a super-high voltage mercury lamp. Thus, the conventional projection display uses an array of LEDs as a light source. In this case, the secondary optics is necessary. However, since the secondary optics has to be lenses, light condensing efficiency deteriorates.

SUMMARY OF THE INVENTION

The present invention provides a projection display which can be made compact and have a long life span by adopting a compact LED.

Additional aspects and advantages of the invention will be set forth in part in the description which follows and, in part, will be obvious from the description, or may be learned by practice of the invention.

According to an aspect of the present invention, there is provided a projection display including an optical modulator to modulate a light beam radiating from an illumination unit, according to image data, and projection optics to magnify and project the modulated light beam emitted from the optical modulator. The illumination unit includes three integrator modules that radiate red, green, and blue beams, respectively, with a uniform intensity of light. Each of the three integrator modules includes: at least one compact light source; and a glass rod that transforms a light beam emitted from the at least one compact light source so as to have a uniform light intensity and emits the modulated light beam. The glass rod includes an incident portion, through which the light beam radiates, and an emission portion through which the light beam is emitted. The incident portion of the glass rod includes a parabolic first reflective surface to collimate the light beam radiating from the at least one compact light source, and the at least one compact light source is located in the vicinity of a focal point of the first reflective surface.

According to an aspect of the present invention, the at least one compact light source may be arrayed so that its optical axis is perpendicular to a principal axis of the first reflective surface.

According to another aspect of the present invention, the incident portion further includes a second reflective surface which faces the first reflective surface and includes an optical window through which the light beam radiates from the at least one compact light source. According to yet another aspect of the present invention, the second reflective surface may incline with respect to the principal axis of the first reflective surface at a predetermined incidence angle, and the at least one compact light source may be arrayed so that its optical axis inclines with respect to the principal axis at the same angle as the predetermined incidence angle as the second reflective surface.

According to another aspect of the present invention, an aspect ratio of an aperture of the integrator module may be equal to an aspect ratio of an aperture of the optical modulator. A size of the aperture of the integrator module may be equal to a size of the aperture of the optical modulator.

The optical modulator may be a reflective optical modulator. According to another aspect of the present invention, the illumination unit further includes a λ/4 plate and a polarizing beam splitter which transmits one of P and S waves and reflects the other one of the P and S waves. The λ/4 plate and the reflective optical modulator are located in one of a transmission direction and a reflection direction, and the one of the P and S waves is modulated by the reflective optical modulator and then incident on the projection optics.

According to another aspect of the present invention, the illumination unit further includes a λ/4 plate and a polarizing beam splitter which transmits one of P and S waves and reflects the other one of the P and S waves. The λ/4 plate and the reflective optical modulator are located in a transmission direction and a reflection direction, respectively, and the P and S waves are modulated by the reflective optical modulator and then incident on the projection optics.

The foregoing and/other aspects of the present invention may be also achieved by providing a projection display including: one or more integrator modules that emit a light beam with a uniform intensity of light; a digital micromirror device that modulates the light beam according to image data; projection optics that magnifies and projects the light beam emitted from the digital micromirror device; and a total internal reflection prism that guides the light beam emitted from the one or more integrator modules toward the digital micromirror device and the light beam emitted from the digital micromirror device toward the projection optics. The one or more integrator modules include: at least one compact light source; and a glass rod that transforms a light beam emitted from the at least one compact light source to have a uniform light intensity and emits the modulated light beam. The one or more integrator modules further includes an incident portion through which the light beam radiates and an emission portion through which the light beam is emitted. The incident portion of the glass rod includes a parabolic first reflective surface to collimate the light beam radiating from the at least one compact light source, and the at least one compact light source is located in the vicinity of a focal point of the first reflective surface.

The foregoing and/other aspects of the present invention may be also achieved by providing a projection display having a light source, the projection display including an integrator module haivng a glass rod having an incident portion to transform a light beam emitted from the light source and an emission portion to emit the transformed light beam substantially in a principal axis of the glass rod, an optical modulator to modulate the light beam emitting the emission portion of the glass rod according to image data, and projection optics to magnify and project the light beam emitted from the optical modulator, wherein the incident portion includes a first reflective surface and a second reflective surface to reflect a first portion of the light beam emitting from the light source and to reflect a second portion of the light beam reflected by the first reflective surface, respectively, and the light source is disposed at a focal point of the first reflective surface.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
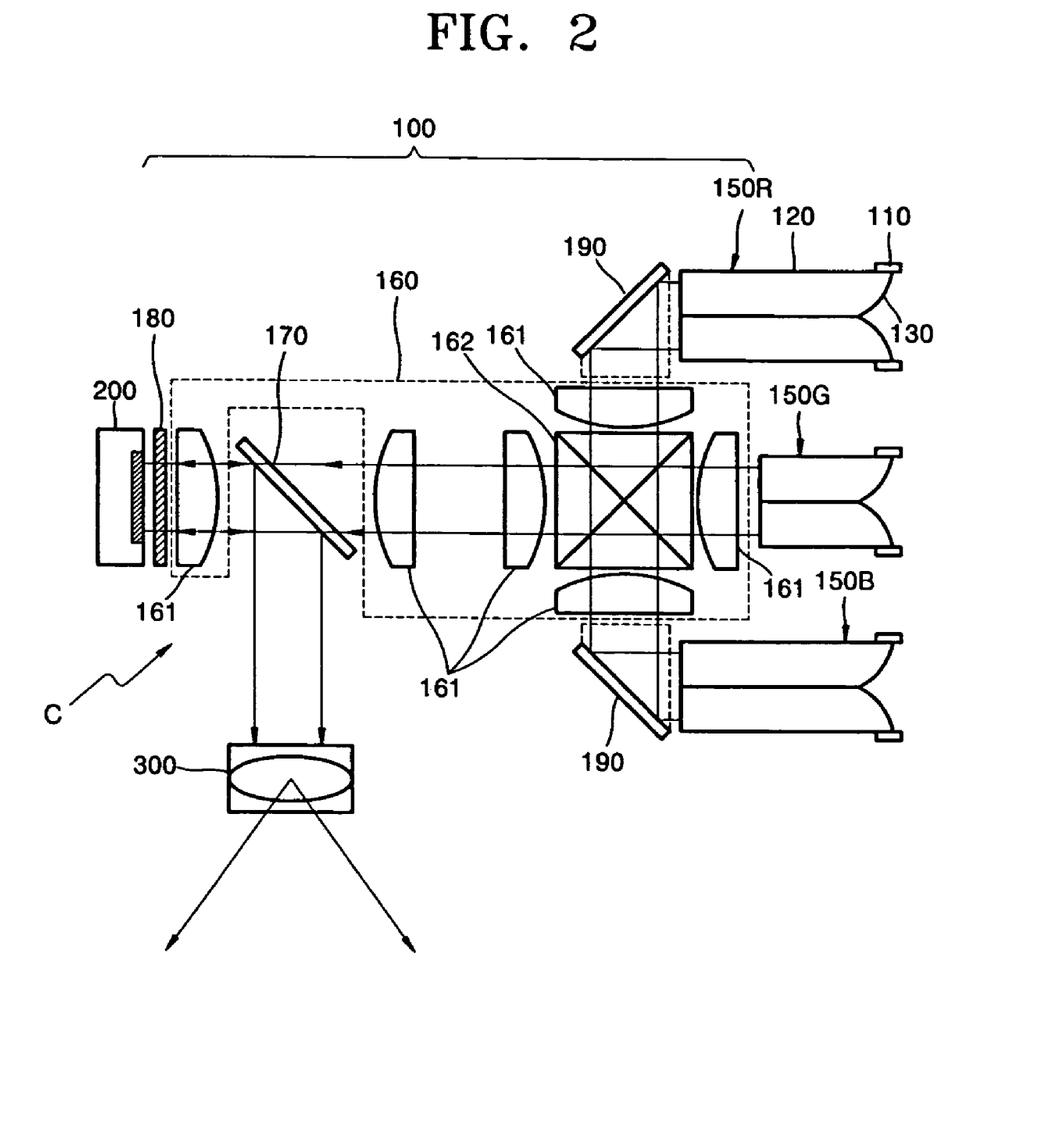
FIG. 2 is a view showing a structure of a projection display according to an embodiment of the present invention.

FIG. 2 is a view showing a structure of a projection display according to an embodiment of the present invention. Referring to FIG. 2, the projection display includes an illumination unit 100, an optical modulator 200, and projection optics 300. The optical modulator 200 modulates a light beam radiating from the illumination unit 100 to be suitable for image data, and then emits the modulated light beam. In the present embodiment, the optical modulator 200 is a reflective optical modulator. The reflective optical modulator may be a digital mirror device (DMD), an LCD panel, a liquid crystal on silicon (LCOS) panel, or the like. In this embodiment, the LCD or LCOS panel with polarization characteristics may be used as the optical modulator 200. Projection displays using the DMD will be explained later with reference to FIGS. 12 and 13. The projection optics 300 magnifies and projects the modulated light beam. The illumination unit 100 includes three integrator modules 150R, 150G, and 150B and relay optics 160. The integrator modules 150R, 150G, and 150B emit R, G and B beams, respectively, which have been modulated so as to have uniform light intensities.

Each of the integrator modules 150R, 150G, and 150B includes a compact light source 110 and a glass rod 120. The light source 110 may be an LED, an organic electro luminescent (EL) device, a laser diode, or the like. The light sources 110 of the integrator modules 150R, 150G, and 150B emit the R, G and G beams, respectively. In a case where the integrator modules 150R, 150G, and 150B include compact light sources 110 which emit white beams, dichroic members (not shown) may be installed in front of emission portions of the integrator modules 150R, 150G, and 150B to transmit the R, G, and B light beams, respectively.

Figure 3:
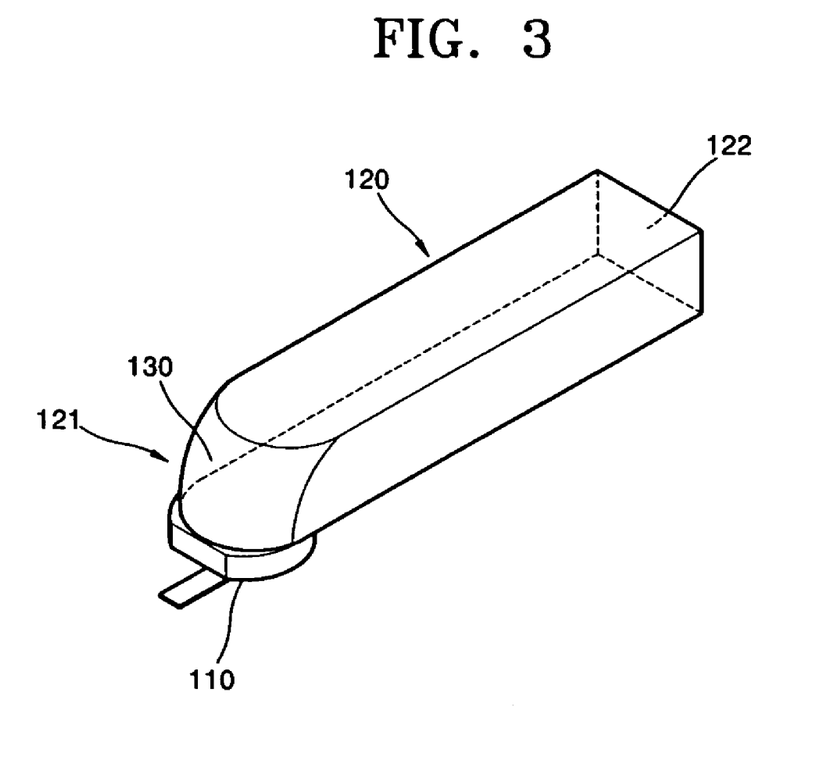
FIG. 3 is a perspective view showing an integrator module used with the projection display shown in FIG. 2, according to another embodiment of the present invention.
Figure 4:
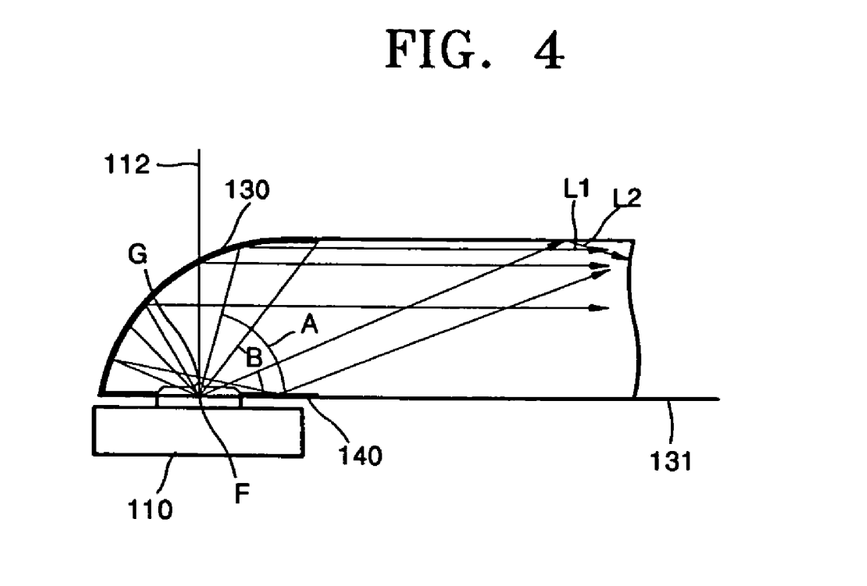
FIG. 4 is a vertical cross-sectional view showing the integrator module of FIG. 3.

FIG. 3 is a detailed perspective view showing one of the integrator modules 150R, 150G, and 150B of the projection display shown in FIG. 2, and FIG. 4 is a vertical cross-sectional view of a portion of the projection display shown in FIG. 3. Referring to FIGS. 3 and 4, the integrator module 150R, 150G, or 150B includes the glass rod 120 and the compact light source 110. The glass rod 120 is formed of a parallelepiped transparent member. Light beams radiating through an incident portion 121 of the glass rod 120 are sequentially reflected from an outer surface toward an emission portion 122 due to a total reflection phenomenon. In this process, since the light beams are mixed, the intensity of light appears uniform at the emission portion 122.

The incident portion 121 of the glass rod 120 includes a first reflective surface 130. The first reflective surface 130 is parabolic and reflects a light beam radiating through a focal point F thereof to be parallel with a principal axis 131. In order to form the first reflective surface 130, an outer surface of the incident portion 121 is made parabolic and coated with a reflective material. The compact light source 110 is located in the vicinity of the focal point F of the first reflective surface 130. The incident portion 121 further includes a plane second reflective surface 140. The second reflective surface 140 may be coated with a reflective material, except an optical window G through which a light beam radiates from the compact light source 110. In this embodiment, the compact light source 110 is arrayed so that its optical axis 112 is perpendicular to the principal axis 131. However, the scope of the present invention is not limited thereto.

As described above, the first reflective surface 130 is defined to have a parabolic shape. The term "parabolic" denotes not only a strict parabolic shape whose conic coefficient K is 1 but also an aspherical shape whose conic coefficient K is in the range of −0.4 to −2.5, preferably, −0.7 to −1.6. The conic coefficient K for the first reflective surface can be adequately determined as any value in the aforementioned reange so that light emitted from a compact light source is collimated to have a radiation angle range that enables the light to effectively illuminate an optical modulator. An example where the first reflective surface 130 has a strict parabolic shape whose K is 1 will now be described.

A light beam radiating from the compact light source 110 at a radiation angle A between 0° and 180° with respect to the principal axis 131 is incident on the first reflective surface 130. In other words, as previously described, the first reflective surface 130 is parabolic and the compact light source 110 is located in the vicinity of the focal point F of the first reflective surface 130. Thus, a first light beam L1 radiates from the compact light source 110 at the radiation angle A greater than an aperture angle B of an aperture of the first reflective surface 130 and is reflected from the first reflective surface 130 toward the glass rod 120 in a direction parallel to the principal axis 131. A second light beam L2 radiates from the compact light source 110 at the radiation angle A smaller than the aperture angle B of the first reflective surface 130 and is not reflected from the first reflective surface 130 but incident directly on the glass rod 120. As a result, a light beam radiating through the incident portion 121 is incident on the glass rod 120 at an incidence angle between 0° and the aperture angle B. To be more specific, the first reflective surface 130 collimates a light beam, which radiates from the compact light source 110 at the radiation angle A between 0° and 180°, to be incident on the glass rod 120 at the incidence angle between 0° and the aperture angle B.

Figure 5:
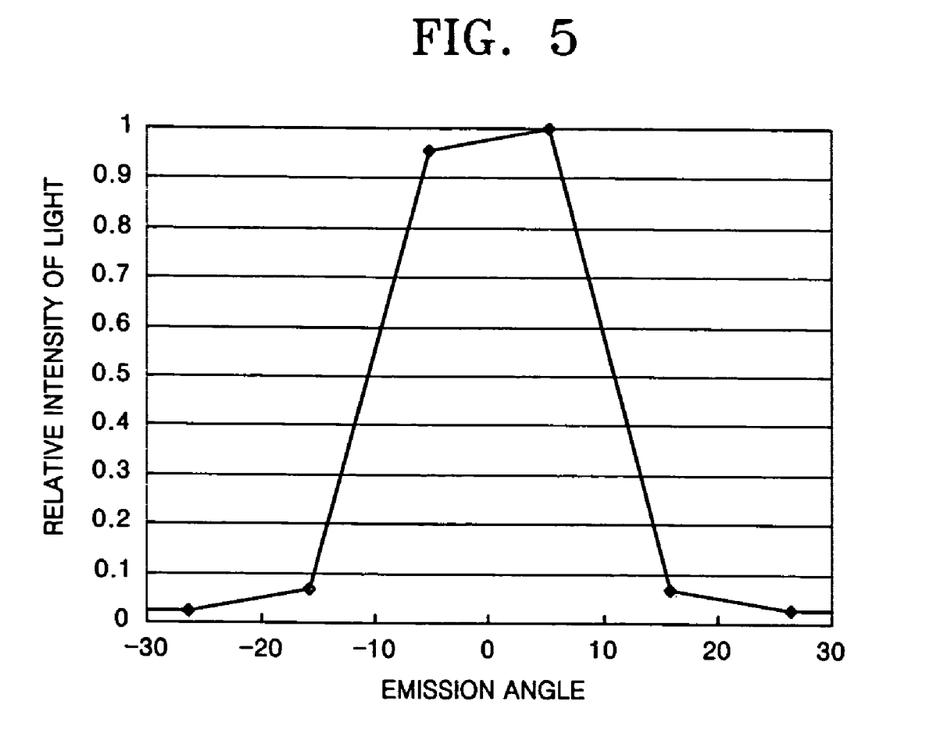
FIG. 5 is a graph showing emission angles at which light beams are emitted from the integrator module of FIG. 3.

FIG. 5 is a graph showing emission angles at which light beams are emitted from the integrator modules 150R, 150G, and 150B. Referring to FIG. 5, a widthwise axis denotes an emission angle, and a lengthwise axis denotes the relative intensity of light. As shown in FIG. 5, the integrator modules 150R, 150G, and 150B collimate light beams at the relative intensity of more than 0.1 within an emission angle between 0° and ±15°. The collimating range defined by the integrator modules 150R, 150G, and 150B can be adjusted by adjusting the aperture angle B. In other words, when the glass rod 120 including the first reflective surface 130 is adopted, a light beam radiating from the compact light source 110 can be efficiently collimated without using a lens. The collimating of the light beam results in increasing an amount of light to be efficiently projected by the projection optics 300. Thus, a light efficiency can be improved. In addition, since the integrator modules 150R, 150G, and 150B have the collimating and integrating functions, the illumination unit 100 can be made compact.

The radiation point of the compact light source 110 is not exactly located at the focal point F. Thus, a portion of the light beams radiating from the compact light source 110 may be reflected from the first reflective surface 130 toward the second reflective surface 140. The second reflective surface 140 reflects the portion of light beams toward the emission portion 122 so as to improve the light efficiency.

Figure 6:
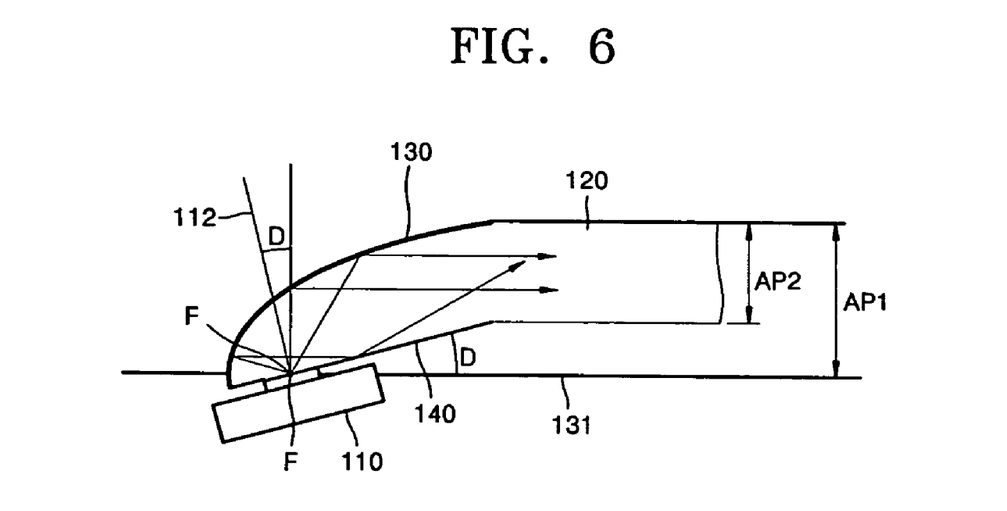
FIG. 6 is a perspective view showing an integrator module uwed with a projection display according to another embodiment of the present invention.

FIG. 6 is a cross-sectional view showing an integrator module used with a projection display according to another embodiment of the present invention. Referring to FIG. 6, the second reflective surface 140 inclines with respect to the principal axis 131 of the first reflective surface 130 at an angle D. The compact light source 110 is installed so that the optical axis 112 is nearly perpendicular to the second reflective surface 140. As a result, the second reflective surface 140 of the compact light source 110 inclines with respect to the principal axis 131 of the first reflective surface 130 at the angle D. This structure can contribute to reducing the size of apertures of the integrator modules 150R, 150G, and 150B. Reference character AP1 denotes the size of the aperture of the integrator module (150R, 150G, and 150B) of FIGS. 3 and 4 in which the second reflective surface 140 is parallel with the principal axis 131. In this embodiment, the second reflective surface 140 is a flat surface. Reference character AP2 denotes the size of the aperture of the integrator module (150R, 150G and 150B) according to this embodiment. Comparing the apertures AP1 and AP2, it is obvious that the size of the aperture of the integrator module (150R, 150G, and 150B) according to this embodiment is smaller than the size of the aperture of the integrator module (150R, 150G, and 150B) shown in FIGS. 3 and 4. The reduction in the size of the aperture is advantageous to arraying a plurality of compact light sources 110 and a plurality of glass rods 120 in the projection display.

Figure 7:
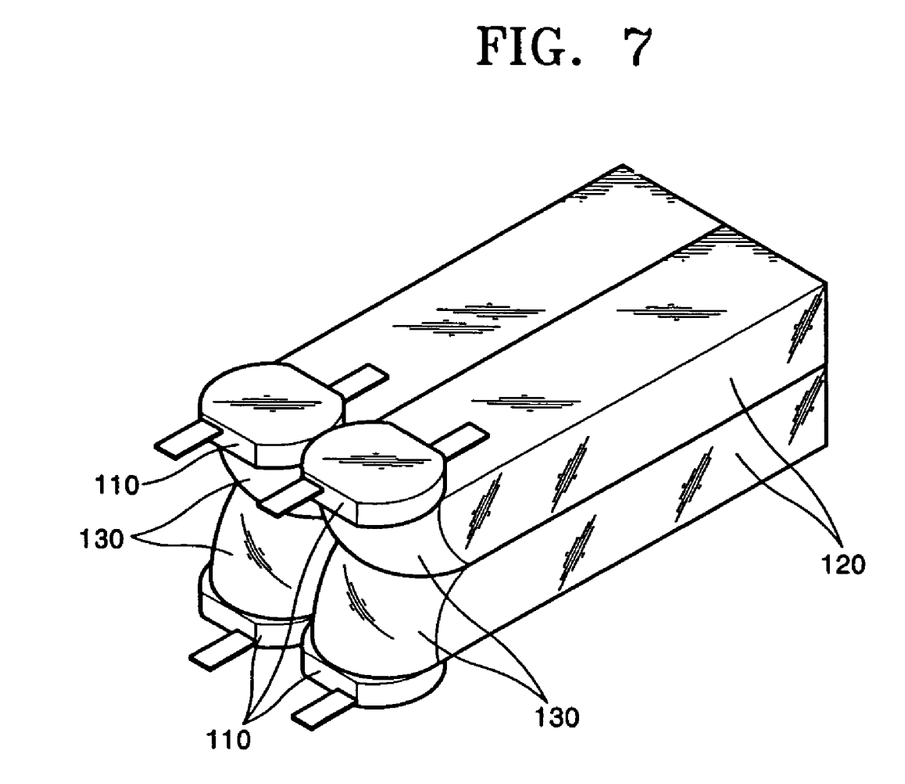
FIG. 7 is a perspective view showing an integrator module used with a projection display according to still another embodiment of the present invention.

In order to secure a sufficient amount of light, as shown in FIG. 7, it is preferable that each of the integrator modules 150R, 150G and 150B includes a plurality of compact light sources 110 and a plurality of glass rods 120. In a case where the integrator module (150R, 150G, and 150B) of FIG. 6 is adopted in the present embodiment, a larger number of compact light sources 110 and a larger number of glass rods 120 can be arrayed in a predetermined space. As a result, brighter illumination light can be obtained.

Figure 8:
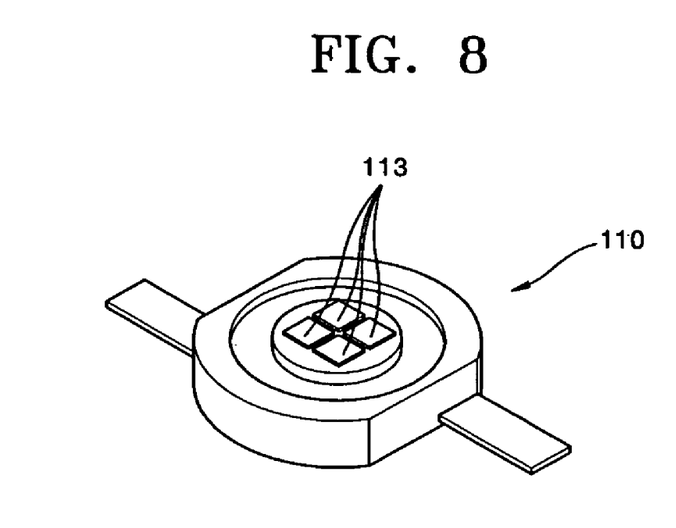
FIG. 8 is a perspective view showing a compact light source used with a projection display according to an embodiment of the present invention.

As shown in FIG. 8, the compact light source 110 may include a plurality of LEDs 113. In this case, the compact light source 110 may be arrayed so that a geometrical center of the LEDs 113 is located in the vicinity of the focal point F of the first reflective surface 130.

It is preferable that an aspect ratio of the aperture of the emission portion 122 of the integrator module (150R, 150G and 150B) is equal to an aspect ratio of an aperture of the optical modulator 200. In this case, the relay optics 160 adjusts light beams emitted from the integrator modules 150R, 150G, and 150B with respect to the aperture of the optical modulator 200 so as to be incident on the optical modulator 200. The aperture of the emission portions 122 of the integrator module (150R, 150G, and 150B) may be equal to the aperture of the optical modulator 200. In this case, the relay optics 160 serves to adjust the light beams emitted from the integrator modules 150R, 150G, and 150B at a magnifying power of 1:1 with respect to the optical modulator 200.

Figure 9:
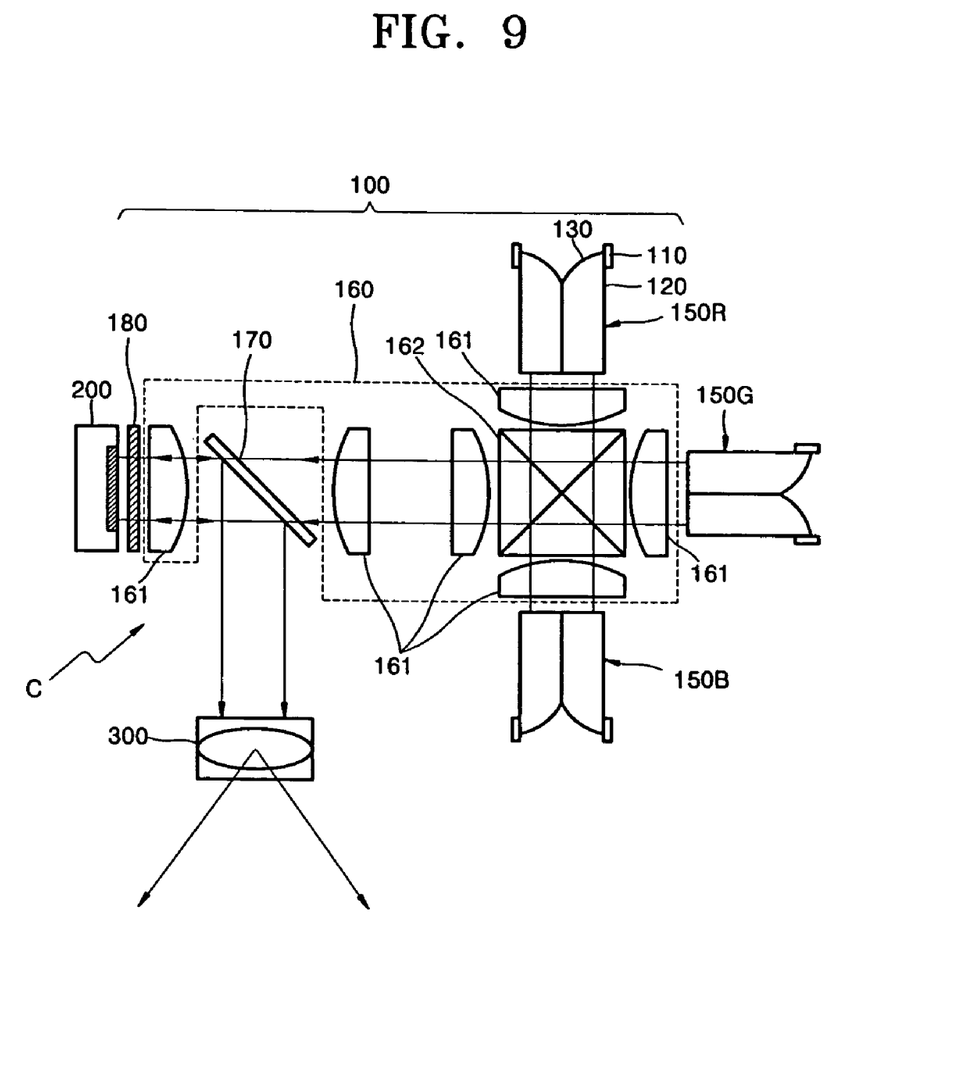
FIG. 9 is a view showing a structure of a projection display according to another embodiment of the present invention.

Referring to FIG. 2, relay optics 160 includes a plurality of relay lenses 161 and an optical path changer 162. The optical path changer 162 selectively transmits or reflects incident light beams according to their wavelengths. The optical path changer 162 allows light beams emitted from the integrator modules 150R, 150G, and 150B to be incident on the optical modulator 200 through the same optical path. The relay lenses 161 are designed to have an appropriate magnifying power according to the relationship between the apertures of the integrator modules 150R, 150G, and 150B and the aperture of the optical modulator 200. Reflector members 190 are provided in front of the emission portions 122 of the integrator modules 150R and 150B. The reflector members 190 guide light beams to the optical path changer 162. Each of the reflector members 190 and the corresponding glass rods 120 may form a single body. For example, as marked with dotted lines, the emission portion 122 of the glass rods 120 are curved or bent to have one or more inclined planes corresponding to the location of the reflector members 190. The one or more inclined planes are coated with a reflective material. In a case where the integrator modules 150R and 150B are installed as shown in FIG. 9, the reflector members 190 are not necessary.

Figure 10:
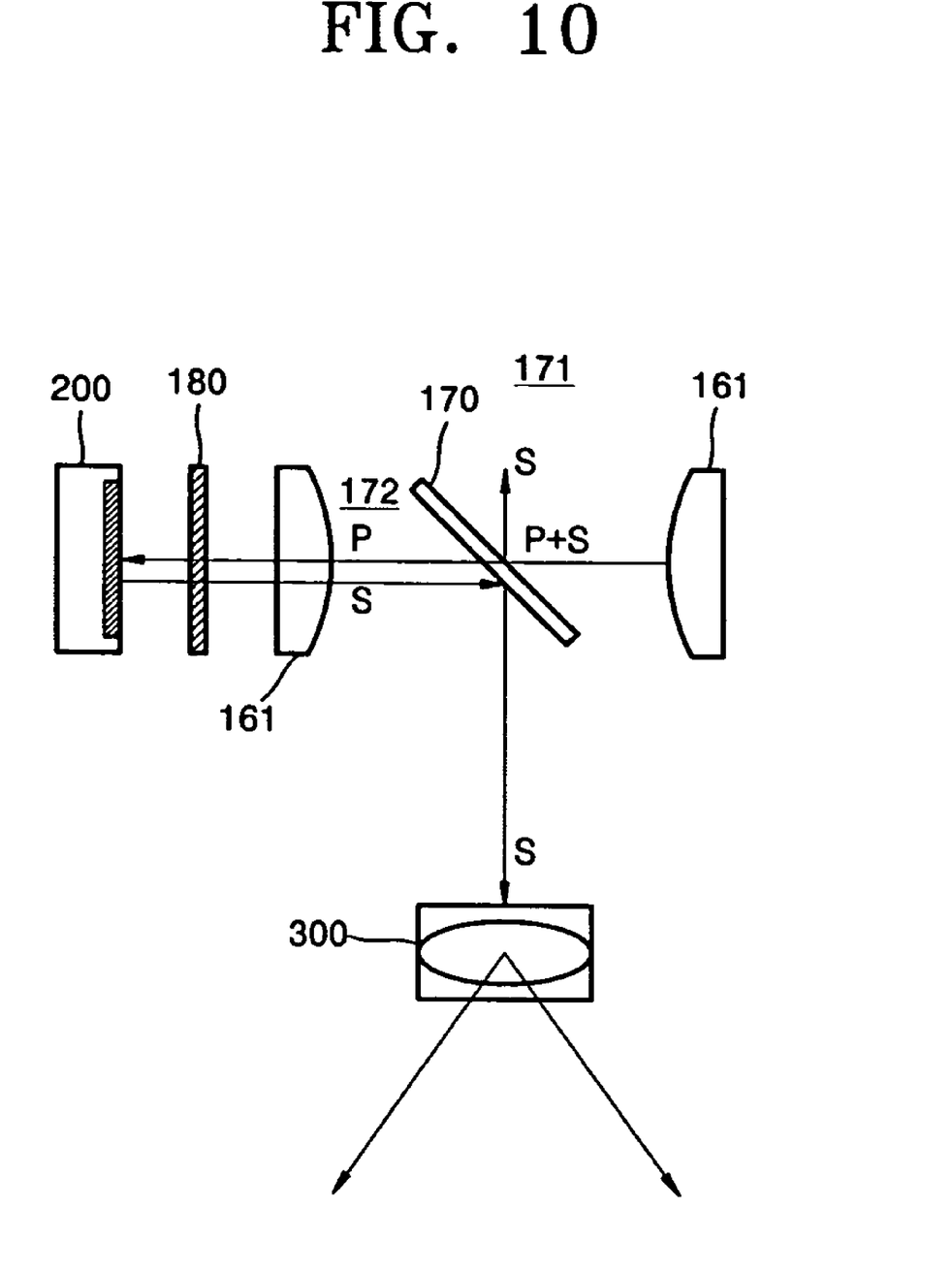
FIG. 10 is a detailed view of a portion C of the projection display shown in FIG. 2.

FIG. 10 is a detailed view showing a portion C of the projection display shown in FIG. 2. Referring to FIG. 10, the optical modulator 200, a polarizing beam splitter (PBS) 170, a $\lambda/4$ plate 180, and projection optics 300 are shown. The PBS 170 transmits one of primary (P) and secondary (S) polarized waves and reflects the other one. The PBS 170 serves to transmit polarized beams to be efficiently used in the optical modulator 200. In present embodiment, the PBS 170 transmits the P wave and reflects the S wave. It can be understood by one of ordinary skill in the art that the opposite case is possible. The optical modulator 200 may be installed in either a reflection direction 171 or a transmission direction 172 along which the PBS 170 transmits or reflects light beams. In this embodiment, the optical modulator 200 is installed in the transmission direction 172. The $\lambda/4$ plate 180 is installed between the optical modulator 200 and the PBS 170.

A light beam radiating from the compact light source 110 is collimated by the first reflective surface 130 of the glass rod 120 so as to be incident on the glass rod 120 at the uniform intensity of light. Next, the relay optics 160 transmits the light beam so as to be incident on the PBS 170. Thereafter, the PBS 170 transmits only a P wave of the light beam and reflects an S wave of the light beam. The $\lambda/4$ plate 180 transmits the P wave so as to be incident on the optical modulator 200. The optical modulator 200 modulates the P wave beam to be suitable for image data and emits the modulated beam. The $\lambda/4$ plate 180 modulates the modulated P wave beam into an S wave beam. The PBS 170 reflects the S wave beam toward the projection optics 300. The projection optics 300 magnifies the S wave beam and then the S wave beam on a screen (not shown).

In the above-described structure, a color image can be projected on the screen by sequentially operating the integrator modules 150R, 150G, and 150B. Also, unlike the conventional projection display using the metal halide lamp or the super-high voltage mercury lamp and a color wheel (not shown), the present invention can realize a compact projection display.

Figure 11:
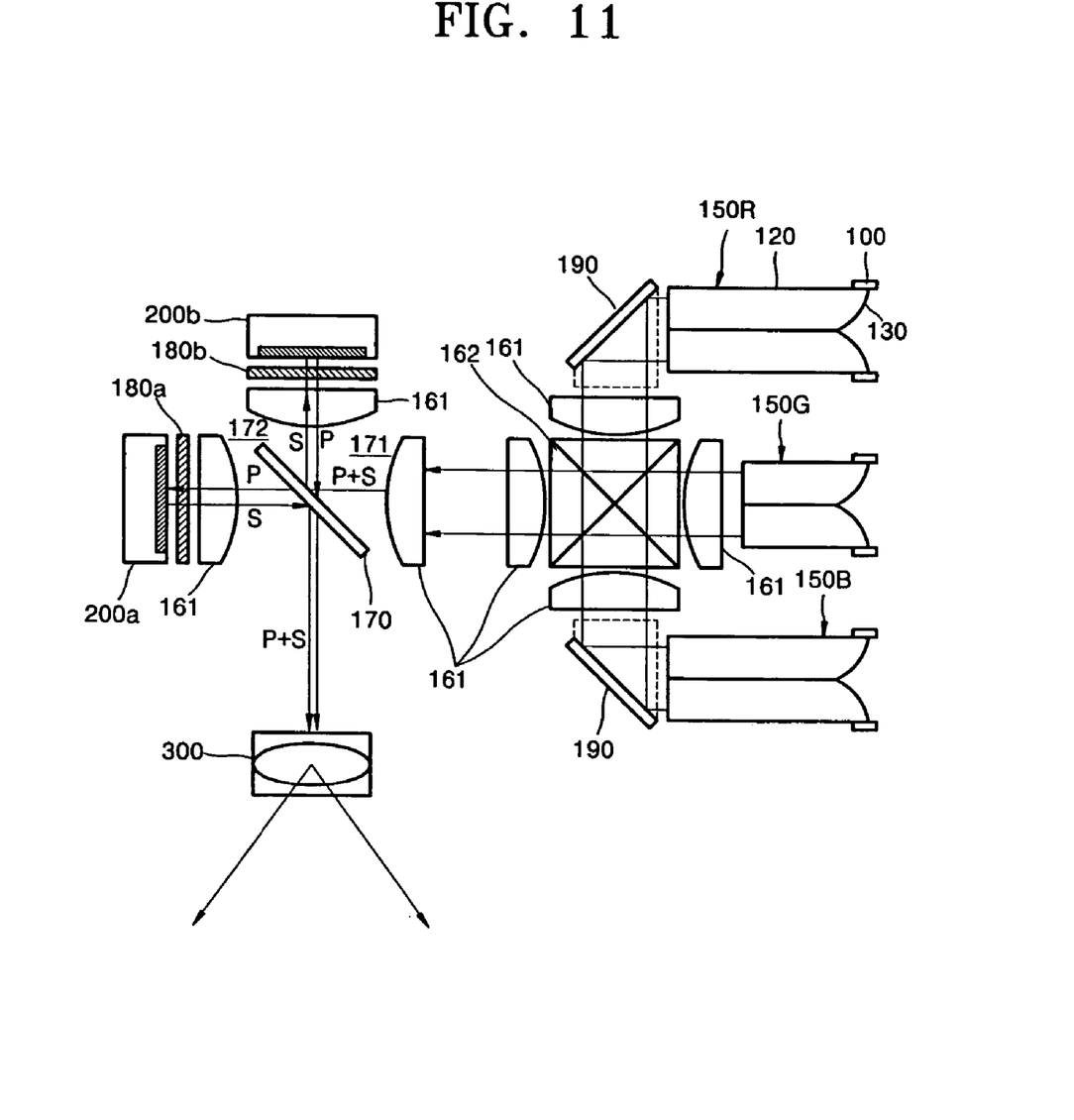
FIG. 11 is a view showing a structure of a projection display according to still another embodiment of the present invention.

FIG. 11 is a view showing a structure of a projection display according to still another embodiment of the present invention. The same reference numerals as those of FIGS. 2 through 10 refer to the like elements, and thus will not be explained herein.

Referring to FIG. 11, a first $\lambda/4$ plate 180a and a first optical modulator 200a, and a second $\lambda/4$ plate 180b and a second optical modulator 200b are prepared in the transmission direction 172 and the reflection direction 171 of the PBS 170, respectively. In the present embodiment, the PBS 170 transmits a P wave and reflects an S wave. It can be understood by one of ordinary skill in the art that the opposite case is possible. The first and second optical modulators 200a and 200b serve to modulate P- and S-polarized beams, respectively.

A P wave of a light beam emitted from the integrator modules 150R, 150G, and 150B passes through the PBS 170 and then is incident on the first optical modulator 200a via the first $\lambda/4$ plate 180a. An S wave of the light beam is reflected from the PBS 170 and is then incident on the second optical modulator 200b via the second $\lambda/4$ plate 180b. The first and second optical modulators 200a and 200b modulate the light beams to be suitable for image data, respectively, and then emit the modulated light beams. The first $\lambda/4$ plate 180a transforms the light beam modulated by the first optical modulator 200a into the S wave beam. The PBS 170 reflects the S wave beam so as to be incident on the projection optics 300. The second $\lambda/4$ plate 180b transforms the light beam modulated by the second optical modulator 200b into the P wave. The PBS 170 transmits the P wave beam so as to be incident on the projection optics 300. The projection optics 300 magnifies the P and S wave beams and then projects the P and S waves on the screen. As a result, light efficiency can be improved.

Figure 12:
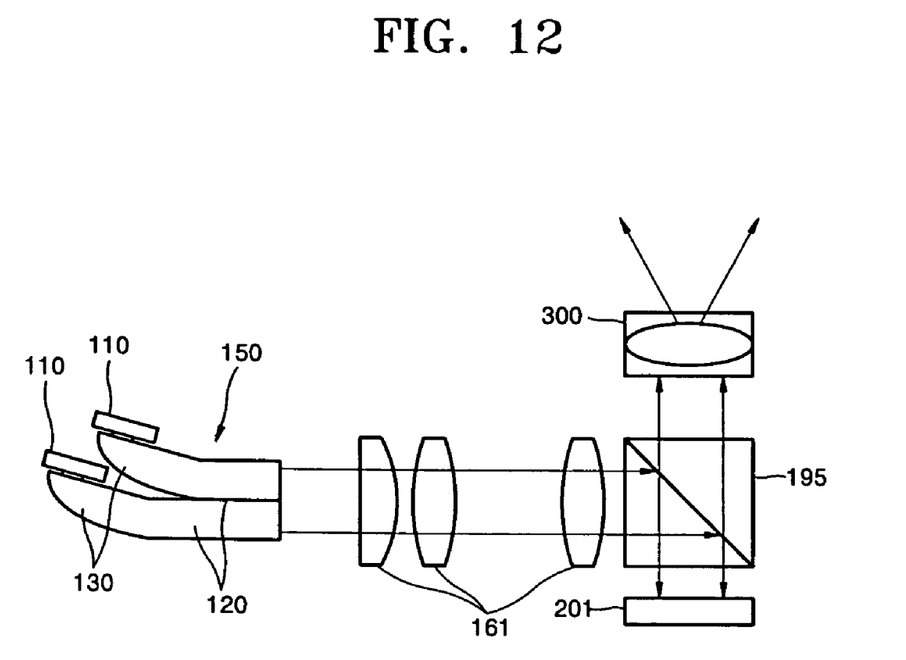
FIGS. 12 and 13 are views showing respective structures of projection displays adopting a digital mirror device (DMD), according to different embodiments of the present invention.
Figure 13:
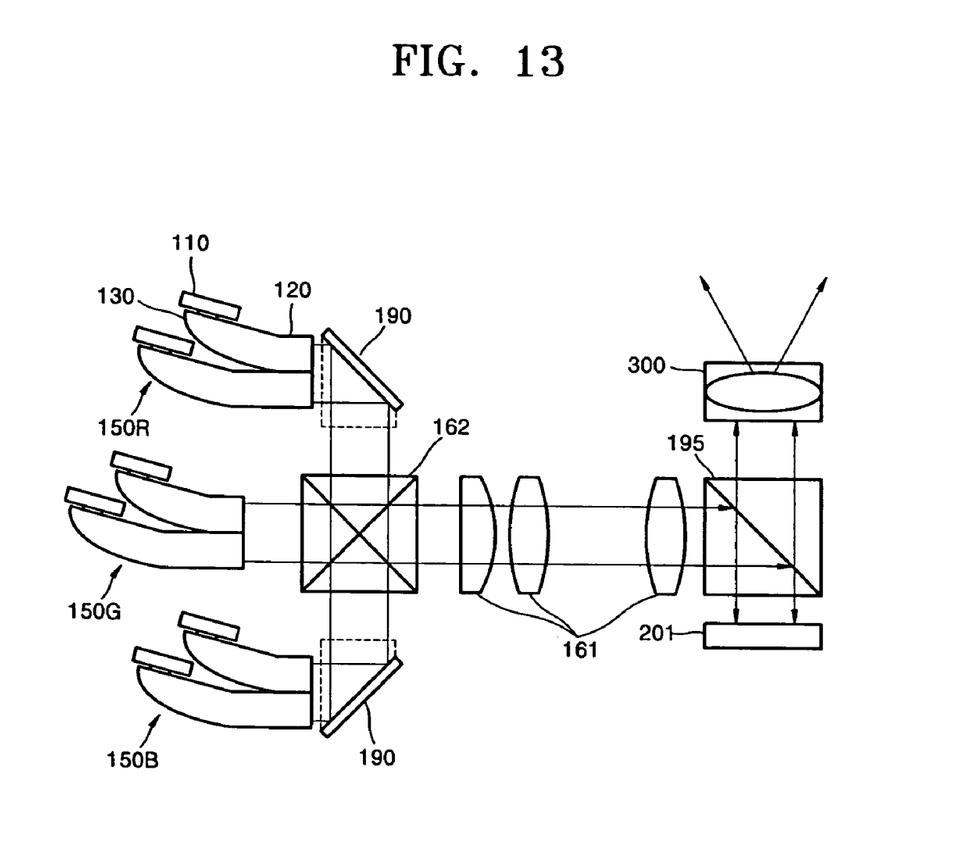

FIGS. 12 and 13 are views showing respective structures of projection displays adopting a DMD with no polarization characteristics, according to different embodiments of the present invention. The same reference numerals as those of FIGS. 2 through 10 refer to the like elements, and thus will not be explained herein.

Referring to FIG. 12, the projection display includes an integrator module 150, a DMD 201, and projection optics 300. Reference numeral 195 denotes a total internal reflection (TIR) prism which guides light beams radiating from the integrator module 150 to the DMD 201 and light beams emitted from the DMD 201 to the projection optics 300. The TIR prism 195 is well known to one of ordinary skill in the art, and thus the detailed descriptions will be omitted. Reference numeral 161 denotes relay lenses which magnify or reduce the light beams radiating from the integrator module 150 or transmit the light beams to the DMD 201 at the magnifying power of 1:1. The integrator modulator as shown in FIGS. 3 through 7 may be used as the integrator module 150. In this embodiment, the integrator module of FIG. 6 is used as the integrator module 150. R, G, and B beams should be sequentially incident on the DMD 201. For this purpose, the integrator module 150 may adopt a compact light source 110 which emits R, G, and B beams. Alternatively, the integrator module 150 may adopt a compact light source 110 to emit white light and a color wheel (not shown) to sequentially transmit R, G, and B beams. Here, the color wheel is installed in front of an emission portion of the integrator module 150.

The R, G and B beams radiating from the integrator module 150 are reflected from the TIR prism 195 toward the DMD 201. The DMD 201 modulates the R, G, and B beams to be suitable for image data and then emits the modulated R, G, and B beams toward the TIR prism 195. The TIR prism 195 then transmits the modulated R, G, and B beams, and then the projection optics 300 projects the R, G, and B beams.

Referring to FIG. 13, three integrator modules 150R, 150G, and 150B radiate R, G, and B beams, respectively. The optical path changer 162 allows the R, G, and B beams to be incident on the DMD 201 through the relay lenses 161 and the TIR prism 195. The DMD 201 modulates the R, G and B beams, the TIR prism 195 reflects the modulated R, G and B beams toward the projection optics 300, and the projection optics 300 projects the R, G, and B beams.

As described above, a projection display according to the present invention can obtain the following advantages.

First, the projection display can include a first reflective surface formed on the integrator module to efficiently collimate a light beam without using a lens.

Second, the projection display can include an integrator module having collimating and integrating functions so as to realize a compact illumination unit.

Third, since the projection display can use a compact light source such as an LED, the projection display can have a long life span.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A projection display comprising an optical modulator to modulate a light beam radiating from an illumination unit according to image data and projection optics to magnify and project the light beam emitted from the optical modulator, the illumination unit comprising:
    three integrator modules that radiate red, green, and blue beams, respectively, with a uniform intensity of light, wherein each of the three integrator modules comprises,
        at least one compact light source, and
        a glass rod that transforms a light beam emitted from the at least one compact light source so as to have a uniform light intensity and emits the transformed light beam, and that comprises an incident portion through which the light beam radiates and an emission portion through which the light beam is emitted; and
    wherein the incident portion comprises a parabolic first reflective surface to collimate the light beam radiating from the at least one compact light source, and the at least one compact light source is located in the vicinity of a focal point of the first reflective surface.

2. The projection display of claim 1, wherein at least one of the three integator modules comprises an aperture with an aspect ratio equal to an aspect ratio of an aperture of the optical modulator.

3. The projection display of claim 1, wherein at least one of the three integrators comprises an aperture with a predetermined size equal to a size of the aperture of the optical modulator.

4. The projection display of claim 1, wherein the at least one compact light source is arrayed so that an optical axis of the at least one compact light source is perpendicular to a principal axis of the first reflective surface.

5. The projection display of claim 1, wherein the incident portion further comprises a second reflective surface which faces the first reflective surface and comprises an optical window through which the light beam radiates from the at least one compact light source.

6. The projection display of claim 1, wherein the second reflective surface inclines with respect to a principal axis of the first reflective surface at a predetermined incidence angle, and the at least one compact light source is arrayed so that an optical axis of the at least one compact light source inclines with respect to the principal axis at the same angle as the predetermined incidence angle as the second reflective surface.

7. The projection display of claim 1, wherein the optical modulator is a reflective optical modulator, and the illumination unit further comprises relay optics which guides the light beam emitted from the at least one of the three integrator modules toward the reflective optical modulator.

8. The projection display of claim 7, wherein the at least one of the three integrator modules comprises an aperture with an aspect ratio equal to an aspect ratio of an aperture of the optical modulator, and the relay optics magnifies or reduces the light beam emitted from the at least one of the three the integrator modules so that the light beam is incident on the reflective optical modulator.

9. The projection display of claim 7, wherein the at least one of the integrator modules comprises an aperture equal to an aperture of the reflective optical modulator, and the relay optics adjusts the light beam emitted from of the at least one of the integrator modules with respect to the aperture of the reflective optical modulator at a magnifying power of 1:1.

10. The projection display of claim 7, wherein the illumination unit further comprises a λ/4 plate and a polarizing beam splitter which transmits one of P and S waves and reflects the other one of the P and S waves, the λ/4 plate and the reflective optical modulator being located in one of a transmission direction and a reflection direction so that one of the P and S waves is modulated by the reflective optical modulator and then incident on the projection optics.

11. The projection display of claim 7, wherein the illumination unit further comprises a λ/4 plate and a polarizing beam splitter which transmits one of P and S waves and reflects the other one of the P and S waves, the λ/4 plate and the reflective optical modulator being located in a transmission direction and a reflection direction, respectively, so that the P and S waves are modulated by the reflective optical modulator and then incident on the projection optics.

12. A projection display comprising:
    one or more integrator modules that emit a light beam with a uniform intensity of light;
    a digital micromirror device that modulates the light beam according to image data;

projection optics that magnifies and projects the light beam emitted from the digital micromirror device; and a total internal reflection prism that guides the light beam emitted from the one or more integrator modules toward the digital micromirror device and the light beam emitted from the digital micromirror device toward the projection optics, wherein the one or more integrator modules comprise, at least one compact light source, and a glass rod that transforms a light beam emitted from the at least one compact light source to have a uniform light intensity and emits the modulated light beam, and comprises an incident portion through which the light beam radiates and an emission portion through which the light beam is emitted; and wherein the incident portion comprises a parabolic first reflective surface to collimate the light beam radiating from the at least one compact light source, and the at least one compact light source is located in the vicinity of a focal point of the first reflective surface.

13. The projection display of claim 12, wherein:

the one or more integrator modules comprise:

three integrator modules that emit red, green, and blue beams, respectively; and the projection display further comprises:

an optical path changer that guides the red, green, and blue beams emitted from the three integrator modules toward the total internal reflection prism.

14. The projection display of claim 12, wherein the one or more integrator modules comprise an aspect ratio equal to an aspect ratio of an aperture of the digital micromirror device.

15. The projection display of claim 12, wherein the one or more integrator modules comprise an aperture with a predetermined size equal to a size of the aperture of the digital micromirror device.

16. The projection display of claim 12, wherein the at least one compact light source is arrayed so that an optical axis of the at least one compact light source is perpendicular to a main axis of the first reflective surface.

17. The projection display of claim 12, wherein the incident portion further comprises a second reflective surface which faces the first reflective surface and comprises an optical window through which the light beam radiates from the at least one compact light source.

18. The projection display of claim 12, wherein the second reflective surface inclines with respect to a principal axis of the first reflective surface at a predetermined incidence angle, and the at least one compact light source is arrayed so that an optical axis of the at least one compact light source inclines with respect to the principal axis at the same angle as the predetermined incidence angle as the second reflective surface.

19. An integrator module having a light source and used with a projection display, comprising:

a glass rod having an incident portion to transform a light beam emitted from the light source, and an emission portion to emit the transformed light beam substantially in a principal axis of the glass rod, wherein the incident portion comprises a first reflective surface and a second reflective surface to reflect a first portion of the light beam emitted from the light source and to reflect a second portion of the light beam reflected by the first reflective surface, respectively, and the light source is disposed at a focal point of the first reflective surface.

20. The integrator module of claim 19, wherein the first reflective surface is a parabolic surface, and the second reflective surface is a flat surface having a portion disposed on the focal point of the first reflective surface.

21. The integrator module of claim 19, further comprising:

a rod portion disposed between the incident portion and the emission portion in a direction parallel to the principal axis to transmit the first portion of the light beam reflected by the first reflective surface and the second portion of the light beam reflected by the second reflective surface to the emission portion substantially in a direction parallel to the principal axis.

22. A projection display having a light source, comprising:

an integrator module comprising a glass rod having an incident portion to transform a light beam emitted from the light source, and an emission portion to emit the transformed light beam substantially in a principal axis of the glass rod;

an optical modulator to modulate the light beam emitting the emission portion of the glass rod according to image data; and projection optics to magnify and project the light beam emitted from the optical modulator, wherein the incident portion comprises a first reflective surface and a second reflective surface to reflect a first portion of the light beam emitting from the light source and to reflect a second portion of the light beam reflected by the first reflective surface, respectively, and the light source is disposed at a focal point of the first reflective surface.

* * * * *